US011546366B2

(12) United States Patent
Allouche et al.

(10) Patent No.: US 11,546,366 B2
(45) Date of Patent: Jan. 3, 2023

(54) THREAT INFORMATION SHARING BASED ON BLOCKCHAIN

(71) Applicant: International Business Machines Corporation, Armonk, NY (US)

(72) Inventors: Yair Allouche, Dvira (IL); Oded Margalit, Ramat Gan (IL); Ravid Sagy, Beit Yizhack (IL); Tom Weiss, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 16/406,044

(22) Filed: May 8, 2019

(65) Prior Publication Data

US 2020/0358801 A1 Nov. 12, 2020

(51) Int. Cl.
*H04L 9/40* (2022.01)
*G06F 16/182* (2019.01)
(Continued)

(52) U.S. Cl.
CPC ...... *H04L 63/1433* (2013.01); *G06F 16/1824* (2019.01); *G06Q 20/12* (2013.01);
(Continued)

(58) Field of Classification Search
CPC . H04L 63/1433; H04L 9/0643; H04L 9/0861; H04L 63/102; H04L 2209/38;
(Continued)

(56) References Cited

U.S. PATENT DOCUMENTS 9,292,381 B2 3/2016 Alperovitch et al.
11,128,437 B1 * 9/2021 Nossik .................... H04L 63/12
(Continued)

FOREIGN PATENT DOCUMENTS

CN 109639643 A * 4/2019
WO 2017127850 7/2017

OTHER PUBLICATIONS

International Search Report and Written Opinion issued by the European Patent Office dated Jun. 29, 2020 for corresponding International Patent Application No. PCT/EP2020/060666; 14 pages.
(Continued)

*Primary Examiner* — Bassam A Noaman
(74) *Attorney, Agent, or Firm* — Gregory J Kirsch

(57) ABSTRACT

Systems and methods provide a platform for threat information sharing. A method comprises transmitting an access permission request to a blockchain network. The request asks for access to cyber threat information stored in at least one cyber threat information storage system. The information may come from a plurality of organizations. The blockchain network may include a blockchain ledger storing access control information from the plurality of organizations. Upon receipt of a reference to an access permission token generated by the blockchain network using at least one smart contract, a transaction request to the cyber threat information server may be sent. In response to the transaction request including the reference to the access permission token, the requested cyber threat information may be retrieved from the cyber threat information server.

14 Claims, 4 Drawing Sheets

(51) Int. Cl.
*G06Q 20/12* (2012.01)
*G06Q 20/38* (2012.01)
*H04L 9/06* (2006.01)
*H04L 9/08* (2006.01)
*H04L 9/00* (2022.01)

(52) U.S. Cl.
CPC ......... *G06Q 20/382* (2013.01); *H04L 9/0643* (2013.01); *H04L 9/0861* (2013.01); *H04L 63/102* (2013.01); *H04L 9/50* (2022.05)

(58) Field of Classification Search
CPC ... G06F 16/1824; G06Q 20/12; G06Q 20/382
See application file for complete search history.

(56) References Cited

U.S. PATENT DOCUMENTS

| | | | |
|---|---|---|---|
| 2005/0010780 A1* | 1/2005 | Kane | G06F 21/6245 713/182 |
| 2014/0026193 A1* | 1/2014 | Saxman | G06F 21/33 726/4 |
| 2015/0172311 A1 | 6/2015 | Freedman et al. | |
| 2016/0308890 A1* | 10/2016 | Weilbacher | H04L 63/1433 |
| 2016/0366174 A1 | 12/2016 | Chernin et al. | |
| 2017/0070506 A1* | 3/2017 | Reddy | G06F 21/56 |
| 2018/0060496 A1* | 3/2018 | Bulleit | H04L 9/3239 |
| 2019/0036932 A1 | 1/2019 | Bathen et al. | |
| 2019/0108323 A1* | 4/2019 | Mintz | G06F 21/105 |
| 2019/0109717 A1 | 4/2019 | Tirumaleswar et al. | |
| 2019/0163896 A1* | 5/2019 | Balaraman | G06F 16/27 |
| 2019/0164157 A1* | 5/2019 | Balaraman | G06Q 20/3823 |
| 2019/0294822 A1* | 9/2019 | Hennebert | G06F 16/2379 |
| 2019/0319968 A1* | 10/2019 | Mehta | H04L 63/1416 |
| 2020/0327250 A1* | 10/2020 | Wang | G06F 21/6218 |
| 2021/0027260 A1* | 1/2021 | Dent-Young | H04L 45/64 |

OTHER PUBLICATIONS

Zhang, Peng et al.: "FHIRChain: Applying Blockchain to Securely and Scalably Share Clinical Data", Computational and Structural Biotechnology Journal, vol. 16 (Jul. 29, 2018), pp. 267-278, XP055569605, Sweden.

Webster, George D., et al.: Sharing is Caring: Collaborative Analysis and Real-Time Enquiry for Security Analytics, 2018 IEEE International Conference on Internet of Things (IThings) and IEEE Green Computing and Communications (Greencom) and IEEE Cyber, Physical and Social Computing (CPSCom) and IEEE Smart Data (SmartData), IEEE, (Jul. 30, 2018) pp. 1402-1409.

Yaana Limited: NFV and the Exchange of Cyber Threat Intelligence; NFVSEC(15)00198 NFV and CTI, ETSI Draft: NFVSEC (15)000198 NFV and CTI, European Telecommunications Standards Institute (ETSI), 650, Route des Lucioles; F-06921, Sofia-Antipolis, France, vol. ISG—NFV, (Jul. 23, 2015), p. 1.

\* cited by examiner

THREAT INFORMATION SHARING BASED ON BLOCKCHAIN

BACKGROUND

The present invention relates to providing distributed, trusted, and anonymized Cyber Threat Information sharing platform based on blockchain technology.

Cyber-attacks constantly increase in terms of sophistication and frequency, causing significant challenges for organizations and governments in defending their data and systems from capable threat actors. Given the risks cyber threats present, it is advantageous that organizations share cyber-threat information to improve their security posture. Cyber-threat information is any information that can serve an organization to identify, measure, and respond to cyber-threats. This may include system artifacts, indicators of compromise (IoC), findings from the analyses of incidents, tactics techniques and procedures used by threat actors as well as network capture files, or even suggested actions to detect, contain, or prevent attacks. By exchanging cyber-threat information within a sharing coalition, organizations can leverage the collective coalition knowledge to gain a more complete understanding of the threats the organization may face. This knowledge can be used to improve the threat detection techniques, defensive capabilities, and mitigation strategies the organization apply.

While the benefits of sharing threat information are recognized, organizations tend to refrain from doing so due to several unresolved challenges. For example, these may include challenges that apply both to consuming and to producing threat information, including establishing trust between the parties; achieving interoperability and automation; safeguarding sensitive information; protecting classified information; and enabling information consumption and publication.

Accordingly, a need arises for techniques that provide a platform for threat information sharing which addresses the challenges existing today.

SUMMARY

Embodiments of the present systems and methods may provide a platform for threat information sharing which addresses the challenges existing today. Embodiments of the present systems and methods may provide a distributed, trusted, and anonymized Cyber Threat Information (CTI) sharing platform based on blockchain technology. Organizations may define their CTI sharing and consumption policies using smart contracts which will be used to control and manage CTI sharing coalitions. Organizations may share information within collations in anonymized manner while knowing that all anonymized organizations within the collation consuming their CTI meet their predefined CTI sharing policy. Information exchanged within coalitions may be logged within the blockchain ledger.

For example, in an embodiment, a computer-implemented method may comprise transmitting, at a computer system comprising a processor, memory accessible by the processor, and computer program instructions stored in the memory and executable by the processor, an access permission request to a blockchain network, the access permission request requesting permission to access cyber threat information stored in at least one cyber threat information storage system storing cyber threat information from a plurality of organizations, the blockchain network including a blockchain ledger storing access control information from the plurality of organizations, receiving, at the computer system, a reference to an access permission token to be used to access the cyber threat information, the access permission token generated by the blockchain network using at least one smart contract, transmitting, at the computer system, a transaction request to the cyber threat information server, the transaction request including the reference to the access permission token, and receiving, at the computer system, the requested cyber threat information, wherein the requested cyber threat information was retrieved from the cyber threat information server using the access permission token.

In embodiments, the access permission request may comprise an indication of the requested cyber threat information and an identifier of identity or pseudoidentity information, stored in the blockchain, of an organization requesting the cyber threat information. The smart contracts may comprise at least one of a registration contract that maps a blockchain address identity of an organization to a pseudoidentity of the organization, policy deployment contract that maps a blockchain address of the organization to cyber threat information sharing and consumption policies of the organization, a coalition relationship contract that regulates the cyber threat information that may be exchanged between organizations, a permission contract that stores and controls retrieval of access permission tokens, a reputation contract that maps a blockchain address identity of an organization to a reputation of the organization, and a payment contract that controls trading of cyber threat information among organization using internal tokens. The access permission token may comprise at least one of a public key of an organization requesting the cyber threat information, access permission privileges of the organization, an expiration time of the access permission token, and a network location of the requested cyber threat information. The transaction request may further comprise at least one of a requested operation and associated metadata, a cryptographic signature of the organization signed by a private key of the organization, and access permission token timestamp information. A hash of cyber threat information stored in the at least one cyber threat information storage system may be stored in the blockchain ledger and the method may further comprise determining, at the computer system, whether the cyber threat information has been altered, using the hash. The computer system may perform the actions of claim 1 using an application program interface.

In an embodiment, a system may comprise a processor, memory accessible by the processor, and computer program instructions stored in the memory and executable by the processor to perform: transmitting an access permission request to a blockchain network, the access permission request requesting permission to access cyber threat information stored in at least one cyber threat information storage system storing cyber threat information from a plurality of organizations, the blockchain network including a blockchain ledger storing access control information from the plurality of organizations, receiving a reference to an access permission token to be used to access the cyber threat information, the access permission token generated by the blockchain network using at least one smart contract, transmitting a transaction request to the cyber threat information server, the transaction request including the reference to the access permission token, and receiving the requested cyber threat information, wherein the requested cyber threat information was retrieved from the cyber threat information server using the access permission token.

In an embodiment, a computer program product may comprise a non-transitory computer readable storage having program instructions embodied therewith, the program instructions executable by a computer comprising a processor, memory accessible by the processor, and computer program instructions stored in the memory and executable by the processor, to cause the computer to perform a method comprising: transmitting an access permission request to a blockchain network, the access permission request requesting permission to access cyber threat information stored in at least one cyber threat information storage system storing cyber threat information from a plurality of organizations, the blockchain network including a blockchain ledger storing access control information from the plurality of organizations, receiving a reference to an access permission token to be used to access the cyber threat information, the access permission token generated by the blockchain network using at least one smart contract, transmitting a transaction request to the cyber threat information server, the transaction request including the reference to the access permission token, and receiving the requested cyber threat information, wherein the requested cyber threat information was retrieved from the cyber threat information server using the access permission token.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide a platform for threat information sharing which addresses the challenges existing today. Embodiments of the present systems and methods may provide a distributed, trusted, and anonymized Cyber Threat Information (CTI) sharing platform based on blockchain technology. Organizations may define their CTI sharing and consumption policies using smart contracts which will be used to control and manage CTI sharing coalitions. Organizations may share information within collations in anonymized manner while knowing that all anonymized organizations within the collation consuming their CTI meet their predefined CTI sharing policy. Information exchanged within coalitions may be logged within the blockchain ledger.

Blockchain by its design is a distributed data base, which allows data sharing without creating a data monopoly or a single point of failure and without the need for trust between all the participants. It may be implemented through a growing list of blocks that are stamped and linked using cryptographic functions. Each block may contain the transaction data, a time stamp, and a link to the previous block. The blockchain design has two defining features: (a) it is resistant to modification of the data it stores—the data in any given block cannot be altered retroactively without the modification of all subsequent blocks, and (b) it may be implemented as a distributed ledger, which allows data sharing without data monopoly or a single point of failure and without the need for trust between all the participants. Adding a new block to the ledger is often done using one of three mechanisms: (1) Byzantine fault tolerance, for example, Hyperledger, (2) proof-of-work (POW), for example, Bitcoin), or (3) proof-of-stake (POS).

Blockchain technology may be advantageous in applications such as distrusted trusted identity management, supply chain control, and voting. In identity management, blockchain may serve as the root of trust for a global, public, permissioned identity utility that enables exchanging identity more securely. Using such a trust framework for point-to-point exchanges of credentials puts identity owners in control, as no personally identifiable information is ever stored on the public ledger. In the supply chain domain, blockchain technology has the potential to improve the visibility and reduce cost by creating a permanent and shared record of every transaction associated with an asset, leading to an unbroken chain of trust between suppliers and consumers. As another example, blockchain technology may ensure a tamper-proof record keeping, identity verification, and proper auditing of a voting process, which may thereby provide virtual certainty of internet-based voting results accuracy.

Figure 1:
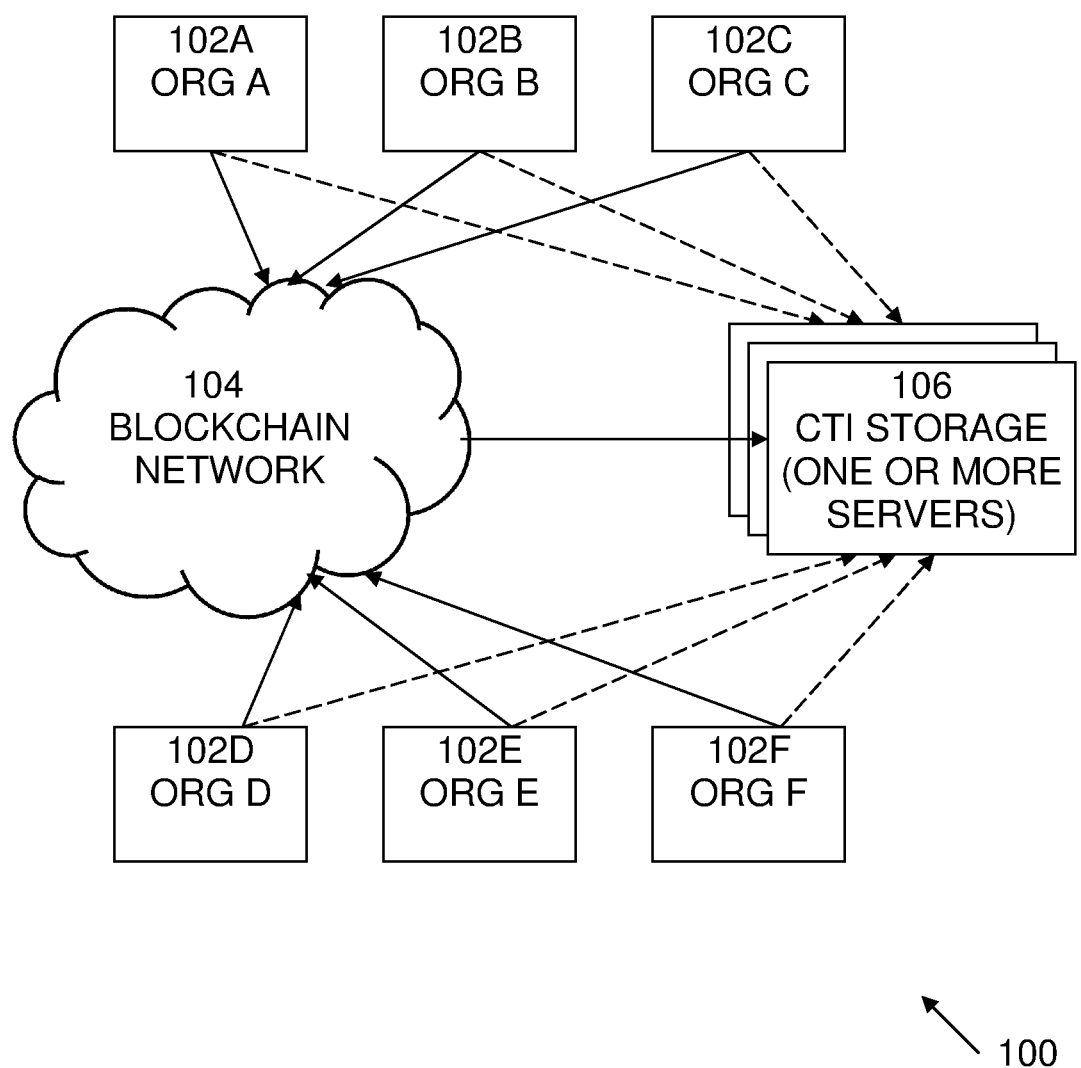
FIG. 1 illustrates an exemplary block diagram of a high-level architecture according to embodiments of the present systems and methods.

Embodiments of the present systems and methods may provide a threat information sharing network that is a decentralized peer-to-peer network, when the members of the network are all considered as part of the same coalition. A coalition in this context is a group of organizations that are sharing threat information in a given scope, for example, finance malware in South America. Coalition sizes may vary widely from two members up to an entire network and change as organizations join and leave dynamically. An exemplary block diagram of a high-level architecture 100 according to embodiments of the present systems and methods is shown in FIG. 1. As shown in this example, architecture 100 may include a plurality of organization computer systems 102A-F, a blockchain network 104, and one or more Cyber Threat Information (CTI) storage systems 106.

Organization computer systems 102A-F may include public, private, standard, or proprietary computer systems operated by or for each organization. Each organization computer system 102A-F may include one or more personal computers, servers, networks, etc. All the organization computer systems 102A-F in the network may be connected to two subnetworks, blockchain network 104, a network formed by CTI storage 106. Blockchain network 104 may be used to control and manage a CTI exchange and a CTI data exchange network implemented on CTI storage systems 106 that will be used for the actual exchange of CTI among the network members.

The CTI data exchange network may include CTI storage systems 106 and clients, a role that may be performed by organization computer systems 102A-F. CTI storage systems 106 provide the capability for a CTI producer, also a role that may be performed by organization computer systems 102A-F, to host a set of CTI data that can be consumed by CTI clients in either a request-response or a publish-subscribe model. CTI storage systems 106 may include one or more servers. CTI storage system 106 may, for example, include one server that stores all the threat information, or, for example, may include multiple servers wherein each server stores information from one or more organizations. The server or servers included in CTI storage system 106 may consume and process access permissions generated by blockchain network 104. The example describe below assumes a request-response model, embodiments of the present systems and method may support a publish-subscribe model as well request-response model.

In embodiments, CTI storage systems 106 may provide services such as Get CTI Item(s)—retrieve a single or a set of CTI items from the CTI storage systems 106, Post CTI Item(s)—add a single or a set of CTI items to the CTI storage systems 106, Delete CTI Item(s)—remove a single or a set of CTI items to CTI storage systems 106 that was posted by the originator of the delete service, Query CTI Item(s)—query the database of CTI storage systems 106.

In embodiments, the CTI data exchange subnetwork may utilize the Trusted Automated Exchange of Intelligence Information (TAXII) protocol and a database to store the information, such as. Mongodb. The TAXII protocol is an application protocol for exchanging CTI over HTTPS. TAXII defines a set of services, messages, and requirements for TAXII Clients and Servers.

Blockchain services. In embodiments, the data exchanged via the CTI data exchange network may be managed by blockchain network 104. In embodiments, blockchain network 104 may provide services such as Access permission, Data authentication, Notification, Navigation, Search, and an Organization information Application Programming Interface (API).

Access permission is a mechanism that allows the definitions of sets of sharing and consuming policies per organization. Sharing policies grant other CTI consumers access permission to the data produced by the policy defining organization. When an organization is about to access CTI storage systems 106, an Access Permission Request (APR) may first be invoked. This request may be processed by smart contracts on the blockchain that will generate an Access Permission Token (APT) asset on the blockchain, representing the privilege of the organization with relation to the requested operation on CTI storage systems 106. The generated APT may be referenced when the organization accesses CTI storage systems 106 to grant the organization with the appropriate permissions as its requested operation is processed. It is to be noted that access to data stored in CTI storage systems 106 does not only include read access. Rather access to such data may include read operations, write operations, delete operations, modify operations, search operations, etc. The particular operations that may be allowed during any particular access may be determined by the permissions defined by each organization regarding its data.

APTs may include an Organization's Public Key, the Organization's Access Permission privileges, Expiration time, and Optional response additional information, such as where the relevant database can be accessed in the network, for example, the hostname and port in a standard network topology).

Data authentication may be performed when a CTI producer uploads a new data set to the CTI storage systems 106. The CTI producer may affix the data with its hash (and sign it using its private key). The data set consumers may use this hash to guarantee that the data have not been altered.

Notification may be performed as blockchain network 104 may act as a network coordinator by using notifications. This may be done across coalition networks, for example, in the case that a new coalition is created, blockchain network 104 may notify relevant organizations about the new coalition. Notification may also be internal to a specific coalition network—when a new record is added or modified within a coalition, blockchain network 104 may notify relevant coalition members about the new record.

Navigation may be performed when a CTI producer uploads a new data set to CTI storage systems 106. The CTI producer may affix the data with additional information indicating how the relevant database can be accessed throughout the network.

Search may be performed by blockchain network 104 as the network coordinator and may provide a search mechanism of the CTI records on the network. As the data itself is not stored on the blockchain, when a CTI producer uploads a new data set to CTI storage systems 106, it may affix the data with different tags describing the CTI record, which will be used by the search mechanism.

Organization information Application Programming Interface (API) may provide the capability for network members to retrieve information stored on the blockchain ledger according to a predefined access control scheme. For example, the organization information API may allow a network member to retrieve the reputation profile of other organizations in the network in order to determine whether to join a coalition created by this organization. It may also allow a CTI producer to retrieve all the download and rating history of its records.

Figure 2:
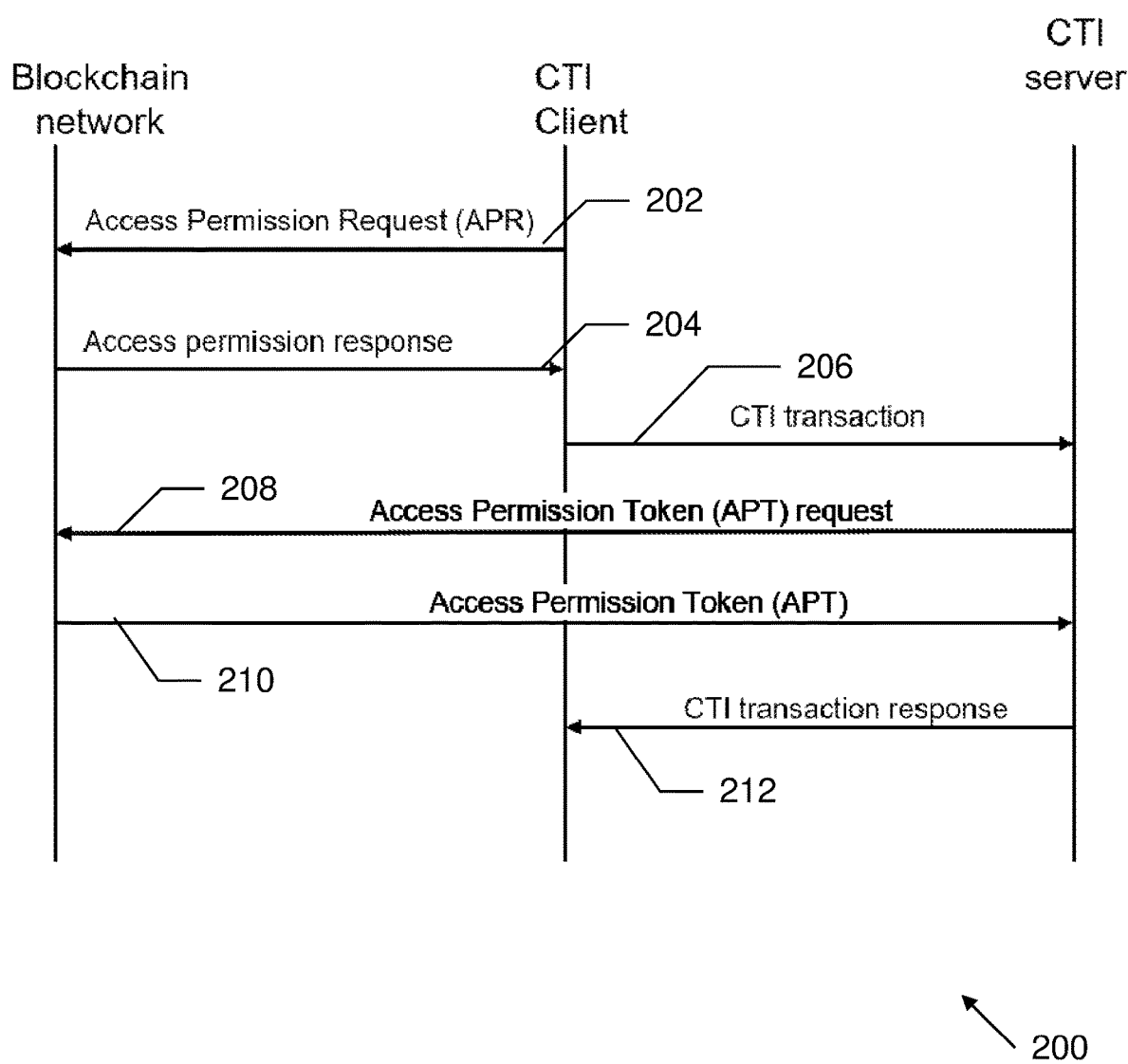
FIG. 2 is an exemplary data flow diagram of a process of end-to-end CTI data exchange according to embodiments of the present systems and methods.

An example of an embodiment of end-to-end CTI data exchange flow 200 is shown in FIG. 2. It is best viewed in conjunction with FIG. 1. Data flow 200 may begin with a CTI client, such as organization computer system 102A-F, sending an access permission request (APR) to blockchain network 104. At 204, blockchain network 104 may use the smart contracts on the blockchain to generate an Access Permission Token APT), store it on the blockchain repository in blockchain network 104 and return a reference to the stored token in an access permission response.

At 206, the organization may send a CTI transaction request to CTI storage systems 106, which includes (1) the requested operation and required relevant metadata, (2) the organization's cryptographic signature signed by the organization private key, (3) the reference to the APT provided by the blockchain network 104, and (4) the APT timestamp information. At 208, upon receiving the CTI transaction request, CTI storage systems 106 may determine whether or not the timestamp is valid. If the timestamp is valid, at 210, CTI storage systems 106 may retrieve the target APT from blockchain network 104 using the APT reference provided as part of the request.

At 212, CTI storage systems 106 may authenticate the organization by using the organization's public key in the APT. If the organization is authenticated, CTI storage systems 106 may check if the requested operation meets the Access Permission privileges in the APT. The permissions may effectively change the operation being carried out. For example, if an organization asks to apply a database query retrieving all the communications with a specific IP, permissions may limit the response to communications over a predefined timeframe. CTI storage systems 106 may then execute the requested operation under the terms granted by the APT and return the relevant information to the requesting organization as a CTI transaction response.

When the CTI client, such as organization computer system 102A-F, receives the CTI record in the CTI transaction response from the CTI storage systems 106, the CTI client may then validate the authenticity of the data using the corresponding hash obtained from blockchain network 104.

Figure 3:
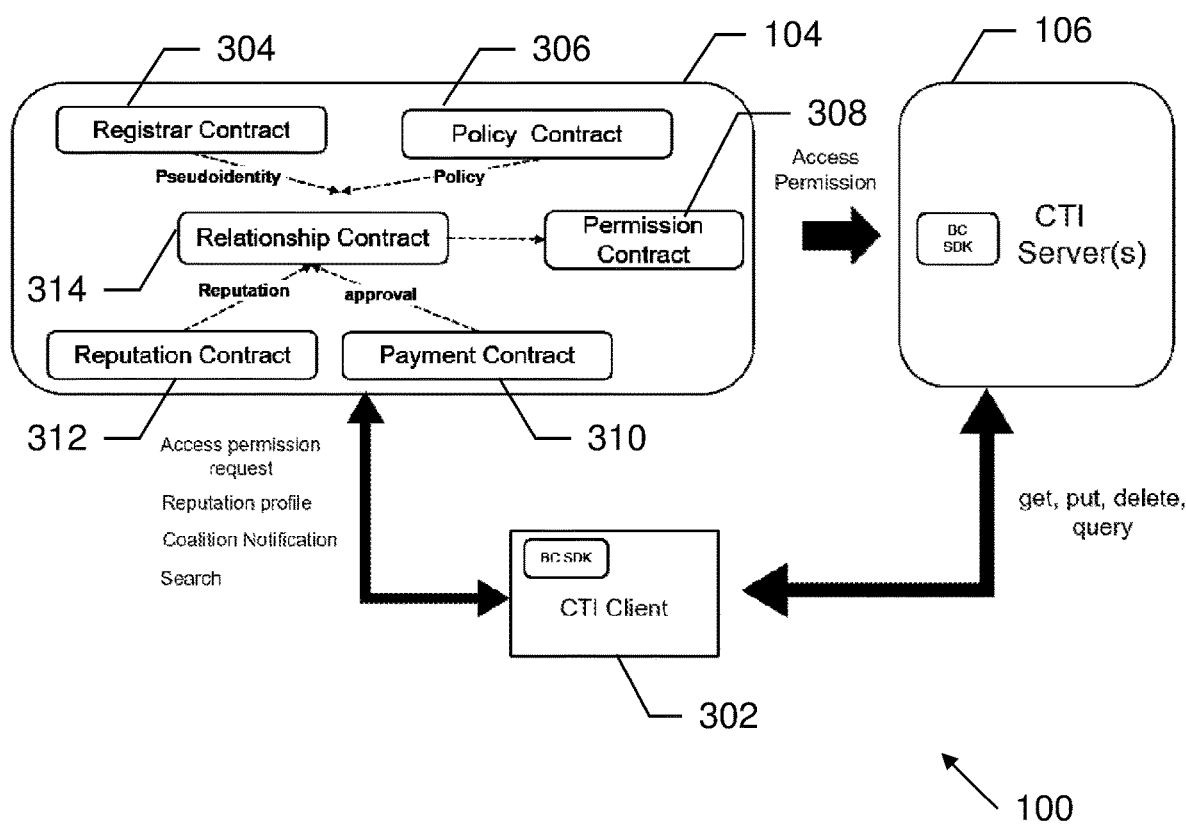
FIG. 3 is an exemplary block diagram of smart contracts according to embodiments of the present systems and methods.

An exemplary block diagram of smart contracts in CTI architecture 100, shown in FIG. 1, is shown in FIG. 3. CTI architecture 300 may include one or more CTI clients 302, such as organization computer systems 102A-F, shown in FIG. 1, blockchain network 104, and CTI storage systems 106. Blockchain network 104 may include a plurality of smart contracts 304-314, which may govern CTI exchange among organizations within the threat information sharing network 100. To do so, the contracts may contain metadata about the record ownership, access permissions and data integrity. The blockchain transactions in the system may carry cryptographically signed instructions to manage these properties. The contract's state-transition functions may carry out policies that enforce data alternation only by legitimate transactions. Such policies may be designed to implement any set of rules which govern a particular CTI record, as long as it can be represented computationally. In order to enable sharing policies of the coalition members without revealing the organizations' real identity, the system 100 may use pseudoidentities. The pseudoidentities may replace organizations' names and may include attributes such as the number of employees in the organization, the organization's peers' score on previous CTI documents it shared (see Reputation Contract below), the organization's headquarters location and whether the organization is GDPR compliance.

In embodiments, the types of smart contracts that may be implemented may include Registration Contract (RC) 304, Policy Deployment Contract (PDC), Coalition Relationship Contract (CRC) 314, Permission Contract (PC) 308, Reputation Contract (RC) 312, and Payment Contract 310.

Registration Contract (RC) 304 may be a global contract that maps organizations' blockchain address identities (equivalent to a public key) to their pseudoidentity. This contract may regulate registering new identities or changing the mapping of existing ones. Identity registration can thus be restricted to certified institutions and may regulate the process and certification needed to support organization pseudoidentities. A set of public keys may be stored as part of an organizations' pseudoidentity for authentication purposes. Using a set of keys allows organizations to use different keys for different transactions, thereby, enabling a high degree of anonymity.

Policy Deployment Contract (PDC) 306 may map organizations' blockchain address identities to their CTI consumption and sharing set of policies. This contract may regulate deploying new policies or changing the mapping of existing ones. A CTI sharing policy may be a set of business rules defining the characteristics of organizations that can consume the CTI shared by the subject organization. Equivalently, a CTI consuming policy may be a set of business rules defining characterizations of organizations from which the subject organization is willing to consume CTI. Each organization may deploy and dynamically change a set of consumption and sharing polices. The sets of polices may reflect different trust levels. When sharing a CTI, the organization may tag the shared CTI with the relevant policy. For example, an organization may define two policies, one that is highly strict and another that is not strict. When sharing highly confidential CTI the organization may tag the CTI with the highly strict policy, and only coalition members that satisfy this policy will be able to consume this sensitive data. Non-sensitive CTI may be tagged with the not-strict sharing policy, so more organizations will be able to consume it.

Coalition Relationship Contract (CRC) 314 may be issued among any pair of members in a coalition and may regulate the CTI that the members may exchange within the coalition. The type of CTI that may be exchanged between the organizations may comply with the matches between the two organizations' consumption and sharing polices. To this end, the contract may interact with the RC and the PDC to retrieve the organizations' policies and pseudoidentities; and then, may verify whether the pseudoidentities of one organization satisfies the different policies of the other organization. The Coalition Relationship Contract may map any pair of organization blockchain address identities to the compliance of each other consumption and sharing polices.

Permission Contract (PC) 308 may store the APTs generated by blockchain network 104. When an organization invokes an APR transaction, the PC may retrieve the relationship between this organization and the CTI owner(s) from the CRC. The contract may generate an APT reflecting this relationship. The APT stored within the blockchain and a reference to this APT may be returned as a reply to the Access Permission Request. When an organization is communicating with CTI storage systems 106, it may provide the pointer to the APT. CTI storage systems 106 may query the blockchain with the given APT pointer to retrieve the actual APT. Then, using the APT, the CTI storage systems 106 may grant the organization with data according to the privilege defined in the APT. The PC may also implement the organization notifications within a coalition.

Reputation Contract (RC) may map each organization's blockchain address identity with a reputation profile. The reputation profile may be a single reputation score but can also be a complex multi-dimensional profile. The reputation profile may be determined based on any applicable reputation system. By integrating this contract within the system, organizations may be able to refer to other organizations' reputation profile within their consumption and sharing policy. For example, organizations may be able to define that only organizations with a reputation score higher than some threshold can see their data. In embodiments of the present systems and methods, the Reputation Contract may be optional.

Payment Contract may allow organizations to trade with CTI using internal tokens system. An initial pre-set number of tokens may be given to any CTI content by the CTI owner. This value may change dynamically based on consumer's peers' score of the content. Tokens may be transferred from the client's wallet to that of the content's supplier based on the content's value. Tokens may be transferred between wallets per request of both sides, allowing for an external trading system with tokens. In embodiments of the present systems and methods, the Reputation Contract may be optional.

Figure 4:
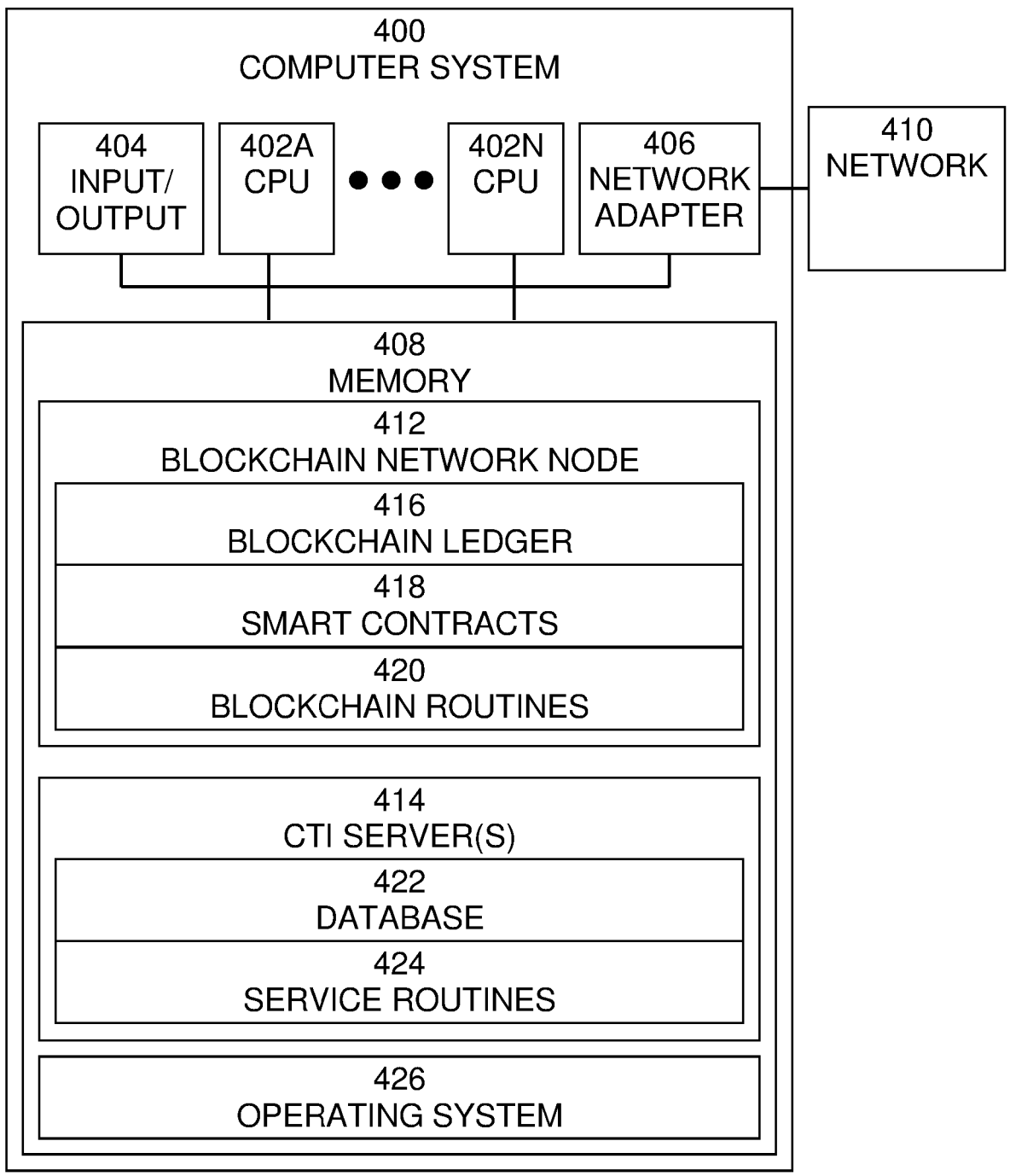
FIG. 4 is an exemplary block diagram of a computer system, in which processes involved in the embodiments described herein may be implemented.

An exemplary block diagram of a computer system 400, in which processes involved in the embodiments described herein may be implemented, is shown in FIG. 4. Computer system 402 may be implemented using one or more programmed general-purpose computer systems, such as embedded processors, systems on a chip, personal computers, workstations, server systems, and minicomputers or mainframe computers, or in distributed, networked computing environments. Computer system 402 may include one or more processors (CPUs) 402A-402N, input/output circuitry 404, network adapter 406, and memory 408. CPUs 402A-402N execute program instructions in order to carry out the functions of the present communications systems and methods. Typically, CPUs 402A-402N are one or more microprocessors, such as an INTEL CORE® processor. FIG. 4 illustrates an embodiment in which computer system 402 is implemented as a single multi-processor computer system, in which multiple processors 402A-402N share system resources, such as memory 408, input/output circuitry 404, and network adapter 406. However, the present communications systems and methods also include embodiments in which computer system 402 is implemented as a plurality of networked computer systems, which may be single-processor computer systems, multi-processor computer systems, or a mix thereof.

Input/output circuitry 404 provides the capability to input data to, or output data from, computer system 402. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 406 interfaces device 400 with a network 410. Network 410 may be any public or proprietary LAN or WAN, including, but not limited to the Internet.

Memory 408 stores program instructions that are executed by, and data that are used and processed by, CPU 402 to perform the functions of computer system 402. Memory 408 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 408 may vary depending upon the function that computer system 402 is programmed to perform. In the example shown in FIG. 4, exemplary memory contents are shown representing routines and data for embodiments of the processes described above. For example, FIG. 4 includes memory contents for both a blockchain network node 412 and CTI server(s) 414. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 4, memory 408 may include blockchain network node 412 and CTI server(s) 414. Blockchain network node 412 may implement one or more nodes of a blockchain network, and may include blockchain ledger 416, smart contracts 418, and blockchain routines 420. Blockchain ledger 412 may include at least a portion of a blockchain. Typically, each node in a blockchain network has a copy of the complete blockchain, but in some embodiments, copies of portions of the complete blockchain may be stored at each node. Smart contracts 418 are contracts or proposed contracts that may be executed or enforced without human interaction, for example, as described above. Blockchain routines 420 may include software routines to perform the processes implemented in blockchain node 412, such as updating and verifying blockchain ledger 416, smart contracts 418, and the processes described above according to embodiments of the present systems and methods. CTI server(s) 414 may provide the capability for a CTI producer to host a set of CTI data that may be consumed by CTI clients in either a request-response or a publish-subscribe model. CTI server(s) 414 may include database 422, and service routines 424. Database 422 may include software routines and data to provide the capability to store, organize, and retrieve CTI data received or generated by CTI server(s) 414, as described above. Service routines 424 may include software routines to perform the processes implemented in CTI server(s) 414, such as the processes described above according to embodiments of the present systems and methods. Operating system 424 may provide overall system functionality.

As shown in FIG. 4, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
   transmitting, at a computer system comprising a processor, memory accessible by the processor, and computer program instructions stored in the memory and executable by the processor, an access permission request to a blockchain network,
   the access permission request requesting permission to access cyber threat information stored in at least one cyber threat information storage system storing cyber threat information from a plurality of organizations,
   the access permission request further comprising an indication of the requested cyber threat information and a pseudoidentity, stored in the blockchain, of an organization of the plurality of organizations requesting the cyber threat information,
   wherein the pseudoidentity comprises attributes including a number of employees in the organization, the organization's score based on previously shared cyber threat information, the organization's headquarters location,
   the blockchain network including a blockchain ledger storing access control information from the plurality of organizations;

receiving, at the computer system, a reference to an access permission token to be used to access the cyber threat information, the access permission token generated by the blockchain network using at least one smart contract;

wherein the smart contract comprises at least:

a payment contract that controls trading of cyber threat information among the plurality of organizations using internal tokens, a permission contract that stores and controls retrieval of access permission tokens, a policy deployment contract that maps a blockchain address and the pseudoidentity of the organization to cyber threat information sharing and consumption policies of the organization, wherein when a cyber threat information of the organization is tagged with a highly strict policy tag, only a coalition member of organizations that satisfy the highly strict policy access the tagged cyber threat information, a reputation contract that maps a blockchain address pseudoidentity of the organization to a reputation of the organization, and at least one of a registration contract that maps a blockchain address identity of an organization to the pseudoidentity of the organization, and a coalition relationship contract that regulates the cyber threat information that may be exchanged between organizations; and transmitting, at the computer system, a transaction request to the cyber threat information storage system, the transaction request including the reference to the access permission token; and receiving, at the computer system, the requested cyber threat information, wherein the requested cyber threat information was retrieved from the cyber threat information storage system using the access permission token.

2. The method of claim 1, wherein the access permission token comprises at least one of a public key of the organization requesting the cyber threat information, access permission privileges of the organization, an expiration time of the access permission token, and a network location of the requested cyber threat information.

3. The method of claim 2, wherein the transaction request further comprises at least one of a requested operation and associated metadata, a cryptographic signature of the organization signed by a private key of the organization, and an access permission token timestamp information.

4. The method of claim 3, wherein a hash of the cyber threat information stored in the at least one cyber threat information storage system is stored in the blockchain ledger and the method further comprises determining, at the computer system, whether the cyber threat information has been altered, using the hash.

5. The method of claim 1, wherein the computer system performs the transmitting and receiving of claim 1 using an application program interface.

6. A system comprising a processor, memory accessible by the processor, and computer program instructions stored in the memory and executable by the processor to perform:

transmitting an access permission request to a blockchain network, the access permission request requesting permission to access cyber threat information stored in at least one cyber threat information storage system storing cyber threat information from a plurality of organizations, the access permission request further comprising an indication of the requested cyber threat information and a pseudoidentity, stored in the blockchain, of an organization of the plurality of organizations requesting the cyber threat information, wherein the pseudoidentity comprises attributes including number of employees in the organization, the organization's score based on previously shared cyber threat information, the organization's headquarters location, the blockchain network including a blockchain ledger storing access control information from the plurality of organizations;

receiving a reference to an access permission token to be used to access the cyber threat information, the access permission token generated by the blockchain network using at least one smart contract;

wherein the smart contract comprises at least a payment contract that controls trading of cyber threat information among the plurality of organizations using internal tokens, a permission contract that stores and controls retrieval of access permission tokens, a policy deployment contract that maps a blockchain address and the pseudoidentity of the organization to cyber threat information sharing and consumption policies of the organization, wherein when a cyber threat information of the organization is tamed with a highly strict policy tag, only a coalition member of organizations that satisfy the highly strict policy access the tamed cyber threat information, a reputation contract that maps a blockchain address pseudoidentity of the organization to a reputation of the organization, and at least one of a registration contract that maps a blockchain address identity of an organization to the pseudoidentity of the organization, and a coalition relationship contract that regulates the cyber threat information that may be exchanged between organizations; and transmitting a transaction request to the cyber threat information storage system, the transaction request including the reference to the access permission token; and receiving the requested cyber threat information, wherein the requested cyber threat information was retrieved from the cyber threat information storage system using the access permission token.

7. The system of claim 6, wherein the access permission token comprises at least one of a public key of the organization requesting the cyber threat information, access permission privileges of the organization, an expiration time of the access permission token, and a network location of the requested cyber threat information.

8. The system of claim 7, wherein the transaction request further comprises at least one of a requested operation and associated metadata, a cryptographic signature of the organization signed by a private key of the organization, and access permission token timestamp information.

9. The system of claim 8, wherein a hash of the cyber threat information stored in the at least one cyber threat information storage system is stored in the blockchain ledger and the system further performs determining, at the system, whether the cyber threat information has been altered, using the hash.

10. The system of claim 6, wherein the transmitting and receiving of claim 6 are performed using an application program interface.

11. A computer program product comprising a non-transitory computer readable storage having program instructions embodied therewith, the program instructions executable by a computer comprising a processor, memory accessible by the processor, and computer program instructions stored in the memory and executable by the processor, to cause the computer to perform a method comprising:

transmitting an access permission request to a blockchain network, the access permission request requesting permission to access cyber threat information stored in at least one cyber threat information storage system storing cyber threat information from a plurality of organizations, the access permission request further comprising an indication of the requested cyber threat information and a pseudoidentity, stored in the blockchain, of an organization of the plurality of organizations requesting the cyber threat information, wherein the pseudoidentity comprises attributes including number of employees in the organization, the organization's score based on previously shared cyber threat information, the organization's headquarters location, the blockchain network including a blockchain ledger storing access control information from the plurality of organizations;

receiving a reference to an access permission token to be used to access the cyber threat information, the access permission token generated by the blockchain network using at least one smart contract;

wherein the smart contract comprises at least a payment contract that controls trading of cyber threat information among the plurality of organizations using internal tokens, a permission contract that stores and controls retrieval of access permission tokens, a policy deployment contract that maps a blockchain address and the pseudoidentity of the organization to cyber threat information sharing and consumption policies of the organization, wherein when a cyber threat information of the organization is tagged with a highly strict policy tag, only a coalition member of organizations that satisfy the highly strict policy access the tagged cyber threat information, a reputation contract that maps a blockchain address pseudoidentity of the organization to a reputation of the organization, and at least one of a registration contract that maps a blockchain address identity of an organization to the pseudoidentity of the organization, and a coalition relationship contract that regulates the cyber threat information that may be exchanged between organizations; and transmitting a transaction request to the cyber threat information storage system, the transaction request including the reference to the access permission token; and receiving the requested cyber threat information, wherein the requested cyber threat information was retrieved from the cyber threat information storage system using the access permission token.

12. The computer program product of claim 11, wherein the access permission token comprises at least one of a public key of the organization requesting the cyber threat information, access permission privileges of the organization, an expiration time of the access permission token, and a network location of the requested cyber threat information.

13. The computer program product of claim 12, wherein the transaction request further comprises at least one of a requested operation and associated metadata, a cryptographic signature of the organization signed by a private key of the organization, and access permission token timestamp information.

14. The computer program product of claim 13, wherein a hash of the cyber threat information stored in the at least one cyber threat information storage system is stored in the blockchain ledger and the method further comprises determining, at the computer program product, whether the cyber threat information has been altered, using the hash.

* * * * *